E. BARTLETT.
POTATO-DIGGER.

No. 181,027.   Patented Aug. 15, 1876.

2 Sheets—Sheet 1.

WITNESSES:
E. Wolff.
John Goethals

INVENTOR:
E. Bartlett
BY
ATTORNEYS.

2 Sheets—Sheet 2.

E. BARTLETT.
POTATO-DIGGER.

No. 181,027. Patented Aug. 15, 1876.

WITNESSES:
E. Wolff.
John Goethals

INVENTOR:
E. Bartlett
BY
Munn & Co.
ATTORNEYS.

UNITED STATES PATENT OFFICE.

EDWARD BARTLETT, OF RENFREW, ONTARIO, CANADA.

IMPROVEMENT IN POTATO-DIGGERS.

Specification forming part of Letters Patent No. 181,027, dated August 15, 1876; application filed April 25, 1876.

*To all whom it may concern:*

Be it known that I, EDWARD BARTLETT, of the village of Renfrew, in the county of Renfrew, Province of Ontario, in the Dominion of Canada, have invented certain new and useful Improvements on Potato - Diggers, of which the following is a specification:

My invention consists, essentially, of improved combinations and arrangements of colters for cutting along the sides of the row of potatoes, a scoop for digging them up, a revolving spout or reservoir for separating them from the earth, beaters for preventing the clogging of vines and weeds on the scoop, a contrivance of the separators for discharging the potatoes into a spout, apparatus for separating and discharging the vines and weeds, and a discharging apparatus for removing the filled boxes which receive the potatoes from the spout; also, supporting, operating, and adjusting devices, all as hereinafter described.

Figure 1:
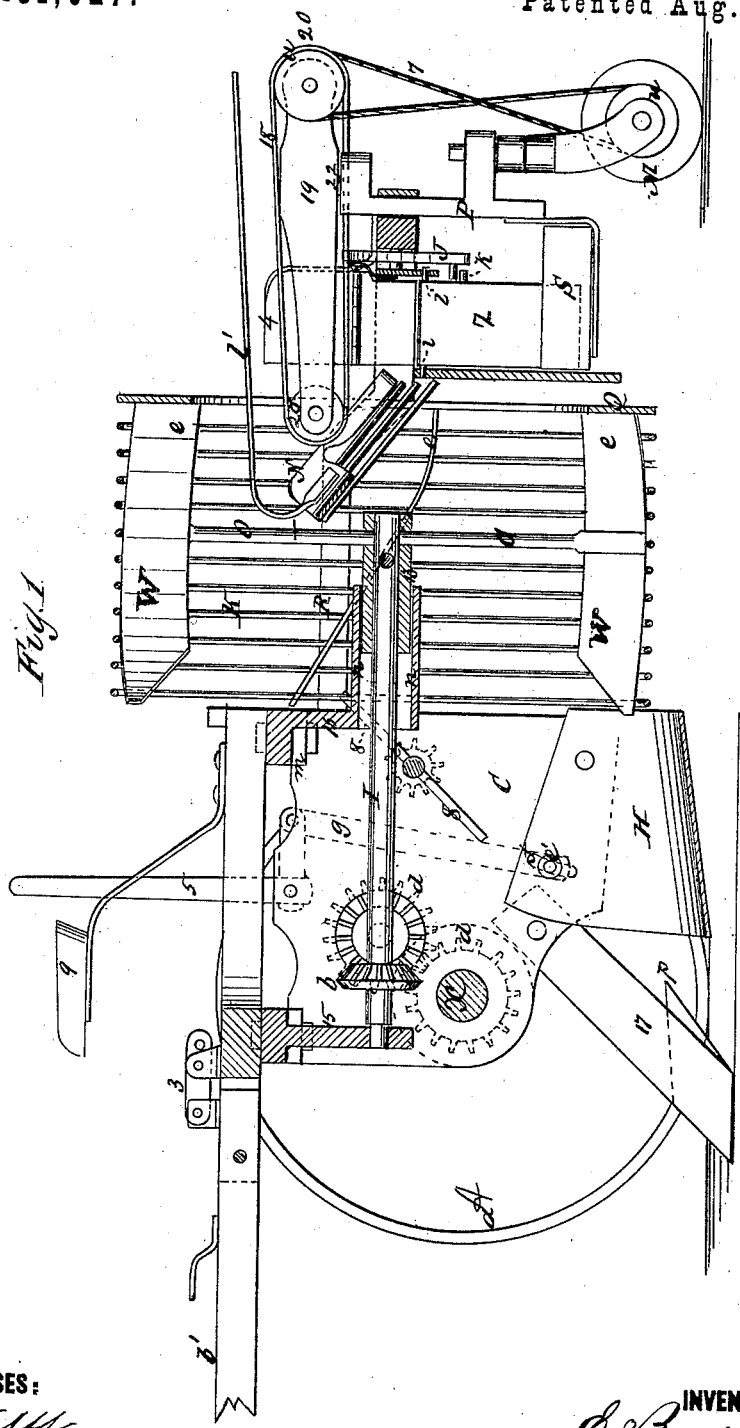
Figure 2:
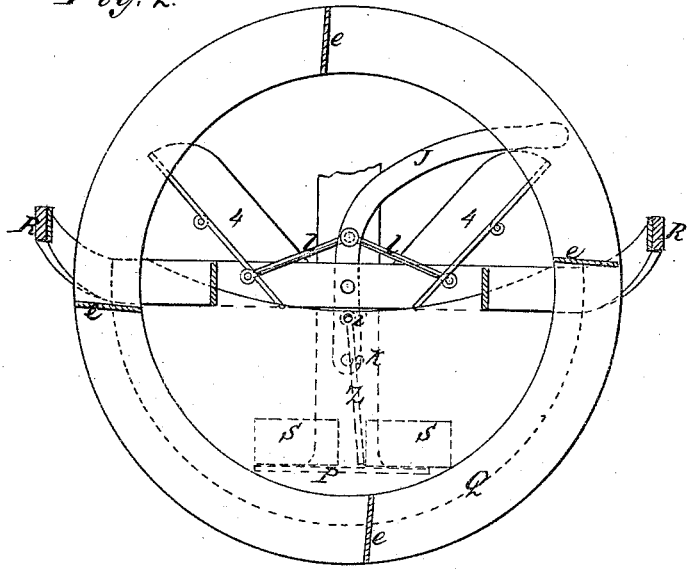
Figure 3:
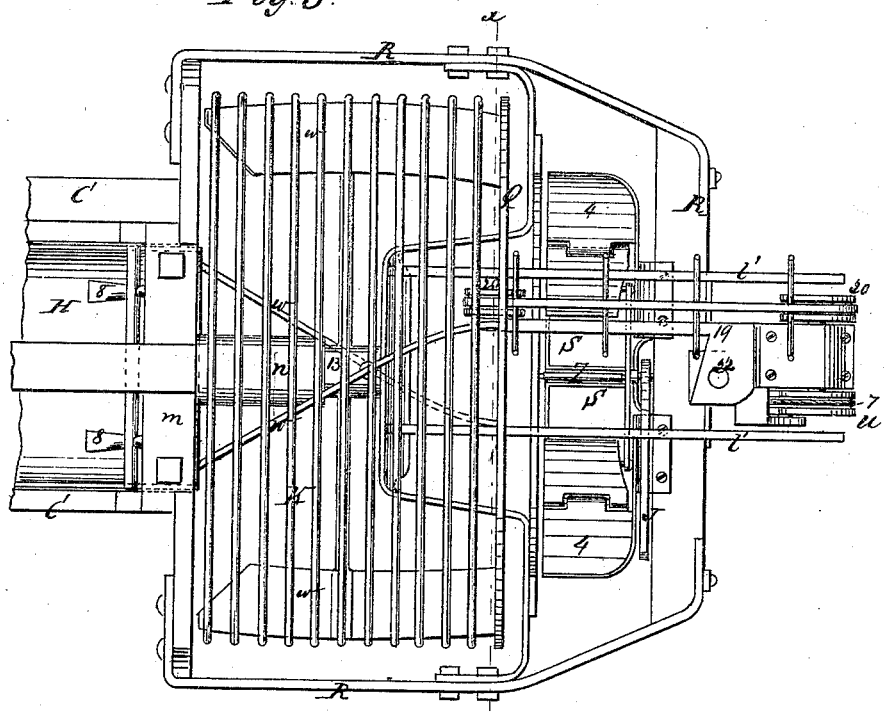

Figure 1 is a longitudinal sectional elevation of the improved machine. Fig. 2 is a plan view, and Fig. 3 is a transverse section taken on line $x\ x$ of Fig. 2.

A represents a driving-wheel, for the double purpose of carrying and driving the machine; K, the separator or screen, consisting of a rotating cylinder, constructed with wire or other suitable material, wound round the circumference, and supported by helical blades or flanges W, attached to spokes or arms O O of a hub, 13, on shaft I, said screen being supported by one set of arms only, and made to revolve by shaft I, connected with miter-gears $b$, which connect by gears $d$ with axle X. The said helical blades W are constructed with a portion, $e$, about six inches of the end next the rim Q, straight or parallel with the length of the cylinder, to lift the potatoes and throw them into the spout N. The rim or flange Q, round the end of screen next spout N, partly closes the end of the cylinder, to prevent the potatoes from being scattered on the ground before being lifted by the helical blades and delivered into spout N. $b'$ is the pole or tongue for the attachment of power to the machine; C C, the sides of the lower part of the frame which carries the shafts and gears for supporting the scoop H, which is suspended, so as to be adjusted up or down, by bolts $e'$, passing through the sides of C C in slots, and attached to the end of rod $g$, connected with lever-rod 5.

3 is the lever for tilting or raising the whole of frame R with cylinder. S S are the boxes for receiving the potatoes; J, the lever for pushing the boxes off the stand P by means of board Z, which is hung by the upper edge to the lever J, catching a projecting pin, $k$, pushing the board, causing it to swing from the bottom and force the box off the stand. The lever works on a greater radius than the board, and, after forcing the board a certain distance, slips past the pin, allowing the board to swing back to its place after pushing off the box. At the same time the lever J, by means of connecting-rods $l$, shifts the adjustable spout 4, so that the potatoes will fall into an empty box, to be at the same time placed on the stand the other side of the board without stopping the machine.

M is a wheel for carrying box-stand P, and driving the endless chain 18, for throwing off the tops and weeds, the driving-wheel being connected thereto by chain-pulleys $u$ and chain 7. 8 is the clearer, consisting of flat beaters, which are made to revolve by suitable gear with gears $d$. Said clearer revolves at the same speed and direction as the driving-wheels, preventing any choking above the scoop.

All the gears and clutches are to be closely covered to prevent the earth from choking them.

9 is the seat for the driver; 15 and 16, the brackets for supporting the cylinder or screen shaft by its front end, 16 being a projecting bracket toward the center of the cylinder from its front end. Said bracket is attached to the sides C C by the cross-piece $m$, being fastened at its ends to said sides, allowing bracket 16 to project toward the center of the cylinder. To the end of bracket 16 is attached a box, $n$, for shaft I to revolve in, on the end of which is attached hub 13, which contains the spokes or arms O, which support and drive the cylinder or screen. Thus the cylinder or screen is supported and driven from the front end.

17 represents the colter attached to the sides C C, so as to run a little in advance of the wheels, and fitted with small mold-boards $p$, to cut and throw weeds, &c., from the sides of the drills toward the wheels and under the same, leaving the sides of the drills cut clear before the scoop H.

The endless chain 18 runs over pulleys 20 20, and is, in the practical machine, fitted with spikes for throwing off the tops, weeds, &c.

The rods $l'$ are attached to the spout N, and run parallel to the chain, a little above it, for carrying the weeds, &c., from the cylinder, and, by the help of chain 18, delivering them a little to the side of the back part of the machine. 19 is a frame for supporting pulleys 20.

The working of the machine is as follows: Motive power, being attached to the pole, moves the machine forward, which motion causes the earth and potatoes to slide back over the scoop H into rotating screen K, which riddles the earth through, while the helical blades carry the potatoes back to the rim, which prevents them from falling out at the bottom of the riddle. The said helical blades W, or the straight portion of them, now lift the potatoes, and, as they revolve with the cylinder, deposit them into spout N, passing down which they fall into the adjustable spout 4; thence to the box S, on one side or the other, according as the spout 4 may be placed by the lever J, which is worked by a man behind the machine, who also places the empty boxes on the stands P. The weeds or potato-tops are prevented from falling among the potatoes by the endless chain 18, and the attached spikes catching them and throwing or carrying them to the back. The said chain-shaft can be adjusted to any angle by turning adjustable frame 19 on pivot 22, to throw the tops, &c., in any desired place or position along the ground.

Having thus described my invention, I make no claim to the mode in which the machine is driven, gear attachments, covers, &c., or the manner in which the drills of potatoes are lifted, for I am well aware these are not new; but

What I claim as new, and desire to secure by Letters Patent, is—

1. The rotary screen K, placed behind wheels A, to allow enlargement of ordinary screen without increasing distance between wheels.

2. The wire spout N, combined with the screen, substantially as herein shown and described.

3. The adjustable spout 4, lever J, and swinging board Z, combined and arranged substantially as herein shown and described.

4. The carrier 18, arranged as shown, in connection with the spout N, to carry off the vines and weeds, as set forth.

5. The rods $l'$, arranged over and in connection with the carrier 18, as and for the purpose set forth.

EDWARD BARTLETT.

Witnesses:
 JOHN R. SMITH,
 J. H. WALFORD.